(12) United States Patent
Maurer et al.

(10) Patent No.: US 9,283,987 B2
(45) Date of Patent: Mar. 15, 2016

(54) METHOD FOR OPERATING A DRIVER ASSISTANCE SYSTEM, AND DRIVER ASSISTANCE SYSTEM

(71) Applicant: Robert Bosch GmbH, Stuttgart (DE)

(72) Inventors: Thomas Maurer, Neuendettelsau (DE); Lutz Buerkle, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/605,162

(22) Filed: Jan. 26, 2015

(65) Prior Publication Data

US 2015/0210311 A1  Jul. 30, 2015

(30) Foreign Application Priority Data

Jan. 27, 2014  (DE) .......................... 10 2014 201 382

(51) Int. Cl.
| | |
|---|---|
| *B62D 15/00* | (2006.01) |
| *B62D 6/00* | (2006.01) |
| *B60W 30/09* | (2012.01) |
| *B62D 15/02* | (2006.01) |

(52) U.S. Cl.
CPC ................. *B62D 6/00* (2013.01); *B60W 30/09* (2013.01); *B62D 15/0265* (2013.01); *B60W 2550/10* (2013.01); *B60W 2710/20* (2013.01)

(58) Field of Classification Search
CPC ............ B60W 30/09; B60W 2550/10; B60W 2710/20; B62D 15/0265; B62D 6/00
See application file for complete search history.

(56) References Cited

U.S. PATENT DOCUMENTS

2007/0299610 A1* 12/2007 Ewerhart .................. B60T 7/22
                                                                     701/301

FOREIGN PATENT DOCUMENTS

DE       102004008894       9/2005

* cited by examiner

*Primary Examiner* — Mussa A Shaawat
*Assistant Examiner* — Yuen Wong
(74) *Attorney, Agent, or Firm* — Kenyon & Kenyon LLP

(57) ABSTRACT

A method is provided for operating a driver assistance system, and a driver assistance system. The method includes the steps: determination of a current position of a pedestrian in an environment surrounding the vehicle; determination of a first current state of motion of the pedestrian; determination of a second current state of motion of the vehicle; calculation of a sojourn probability distribution of the pedestrian, the sojourn probability distribution being a function of time and of space and being based on a pedestrian motion model in connection with the determined current position of the pedestrian and the determined current state of motion of the pedestrian; calculation of a trajectory, based on the calculated sojourn probability distribution of the pedestrian and on the second current state of motion of the vehicle, having a minimum collision probability for the vehicle and the pedestrian; and operation of the driver assistance system of the vehicle based on the calculated trajectory.

8 Claims, 5 Drawing Sheets

METHOD FOR OPERATING A DRIVER ASSISTANCE SYSTEM, AND DRIVER ASSISTANCE SYSTEM

FIELD OF THE INVENTION

The present invention relates to a method for operating a driver assistance system for a vehicle, and to a driver assistance system for a vehicle.

BACKGROUND INFORMATION

Modern vehicles, in particular motor vehicles, often have driver assistance systems that support the driver in difficult or stressful driving situations. Such driver assistance systems can also be used to avoid accidents involving the vehicle, or at least to reduce the severity of an unavoidable accident.

German Published Patent Application No. 10 2004 008 894 discloses a safety system for a means of locomotion, as well as an associated method, that supports an evasive maneuver introduced by the driver of the means of locomotion when approaching an obstacle, thus avoiding an accident due to a collision. An evaluation unit of the safety system determines at least one driving variant, in particular at least one evasion trajectory and/or at least one automatic emergency braking process, from internal and external conditions acquired by an acquisition unit. During or after the introduction of a driving maneuver, in particular an evasive maneuver or an emergency braking maneuver, by the driver of the means of locomotion, the evaluation unit can specify, support, and/or propose this driving maneuver in an optimized form.

SUMMARY

The present invention discloses a method, and a driver assistance system.

Accordingly, provided is a method for operating a driver assistance system for a vehicle, having the steps: determination of a current position of a pedestrian in the environment around the vehicle; determination of a first current state of motion of the pedestrian; determination of a second current state of motion of the vehicle; calculation of a sojourn probability distribution of the pedestrian, the sojourn probability distribution being a function of time and of space and being based on a pedestrian motion model in connection with the determined current position of the pedestrian and the determined current state of motion of the pedestrian; calculation of a trajectory based on the calculated sojourn probability distribution of the pedestrian and on the second current state of motion of the vehicle, with a minimum collision probability for the vehicle; and operation of the driver assistance system of the vehicle based on the calculated trajectory.

All steps, in particular the calculation of the sojourn probability distribution, can be carried out once, but advantageously can be carried out regularly, and preferably can be carried out continuously.

The method can be carried out in particular when a potentially dangerous situation is detected, for example if the pedestrian is situated in the driving tube or in the present trajectory of the vehicle, or, due to his direction of motion, will be situated there at the same time as the vehicle.

Also provided is a driver assistance system for a vehicle, having: a pedestrian detection device for determining a current position of a pedestrian in the environment surrounding the vehicle; a first state of motion determining device for determining a first current state of motion of the pedestrian; a second state of motion determining device for determining a second current state of motion of the vehicle; a first computing device for calculating a sojourn probability distribution of the pedestrian, the sojourn probability distribution being a function of space and of time and being based on a pedestrian motion model in connection with the determined current position of the pedestrian and the determined current state of motion of the pedestrian; a second computing device for calculating a trajectory, based on the calculated sojourn probability distribution of the pedestrian and the second current state of motion of the vehicle, having a minimum collision probability for the vehicle; and a control device for operating the driver assistance system of the vehicle based on the calculated trajectory.

The state of motion determining devices and/or the pedestrian detection device can be different from one another or can be completely or partly identical to one another, and can for example include camera devices such as stereo video camera devices, laser scanners, etc.

The recognition on which the present invention is based is that, taking into account concrete motion models for traffic participants, trajectories for a vehicle as traffic participant can be calculated that minimize a risk of accident and/or can reduce the severity of an accident. Such trajectories can be referred to as optimal trajectories.

In particular, a pedestrian motion model and/or a vehicle motion model can be used that can include physical, static, and/or psychological elements. Physical elements of a pedestrian motion model can for example be that in the pedestrian motion model it is defined with what speed and/or acceleration a pedestrian can move in all directions, for example as a function of his current orientation. Ordinarily, the speed of motion in a backward direction is less than a speed of motion in the forward direction.

Static and psychological elements of a pedestrian motion model can for example include that there is only a low probability that a pedestrian in forward motion will for example execute an abrupt jump backwards. It can also be defined in the pedestrian motion model that the pedestrian, when at a standstill, is more likely at first to move with a lower speed than with a higher speed. In addition, it can also be taken into account that for psychological reasons pedestrians may tend to go around and/or to jump over obstacles in a particular direction of rotation and/or at a particular distance, or that pedestrians will always react to particular traffic situations for example by remaining at a standstill.

The pedestrian motion model differs strongly from the vehicle motion model in particular in the static and/or psychological elements.

According to a preferred development, the operation of the driver assistance system of the vehicle takes place in such a way that the vehicle is steered along the calculated trajectory by the driver assistance system. In this way, the calculated trajectory can be traveled by the vehicle in a particularly efficient and precise manner.

According to a further preferred development, the first current state of motion of the pedestrian includes information concerning orientation, speed, acceleration, standing, walking, and/or running In this way, a particularly accurate prediction can take place, i.e. calculation of the future sojourn probability distribution.

According to a further preferred development, in addition a first individual feature of the pedestrian is acquired. The calculation of the sojourn probability distribution of the pedestrian, the calculation of the trajectory of the vehicle, and/or the operation of the driver assistance system of the vehicle can in addition take place based on the acquired first individual feature of the pedestrian. For example, using a camera device of the vehicle and a camera image evaluation device of the vehicle, it can be determined that the pedestrian is using crutches or is elderly. The pedestrian motion model for the pedestrian can be correspondingly selected and/or adapted, for example by assigning lower probabilities to higher speeds and/or accelerations of the pedestrian. The driver assistance system can have a first feature determination device for the acquisition of the first individual feature.

According to a further preferred development, the method includes the following steps: determination of a further current position of a further vehicle; determination of a third current state of motion of the further vehicle; and calculation of a further sojourn probability distribution of the further vehicle, the further sojourn probability distribution being a function of time and of space and being based on a vehicle motion model in connection with the determined further current position of the further vehicle and with the determined third current state of motion of the further vehicle; the calculation of the trajectory further being based on the calculated further sojourn probability distribution of the further vehicle. Thus, the predicted behavior of additional traffic participants can also be taken into account in the calculation of the trajectory, to which motion models that differ from the pedestrian motion model are a better fit.

According to a further preferred development, in addition a second feature of the further vehicle is acquired. The calculation of the further sojourn probability distribution of the further vehicle, the calculation of the trajectory, and/or the operation of the driver assistance system of the vehicle can in addition take place based on the acquired second feature of the further vehicle. For example, the second feature can include a vehicle model and/or a vehicle type of the further vehicle. For example, a maximum acceleration of a particular vehicle type can be stored in a database of the driver assistance system.

If it is determined, for example by a camera device of the vehicle and a camera image evaluation device of the vehicle, that the additional vehicle is of the particular vehicle type, the vehicle motion model used for the further vehicle can be correspondingly selected and/or adapted.

According to a further preferred development, the calculation of the trajectory takes place using a potential field method, according to which a target point of the vehicle exerts an attractive force and the sojourn probability distribution of the pedestrian exerts a repulsive force. In this way, the calculation of the trajectory can take place with a particularly low technical and resource outlay.

According to a further preferred development, the surrounding environment of the vehicle is modeled in a grid representation, the sojourn probability distribution of the pedestrian indicating a time-dependent sojourn probability distribution of the pedestrian in each of a multiplicity of cells of the grid representation. At a particular time, the trajectory can be routed through those cells in which the sojourn probability of the pedestrian and/or of the further vehicle at the particular time is less than or equal to a specifiable threshold value.

According to a further preferred development, the driver assistance system includes a steering device for steering the vehicle along the calculated trajectory. The steering device can be an active steering system, for example having the possibility of steering moment superposition, and/or including an active brake.

BRIEF DESCRIPTION OF THE DRAWINGS

In all the Figures, identical or functionally identical elements and devices have been provided with the same reference characters, unless otherwise indicated.

DETAILED DESCRIPTION

Figure 1:
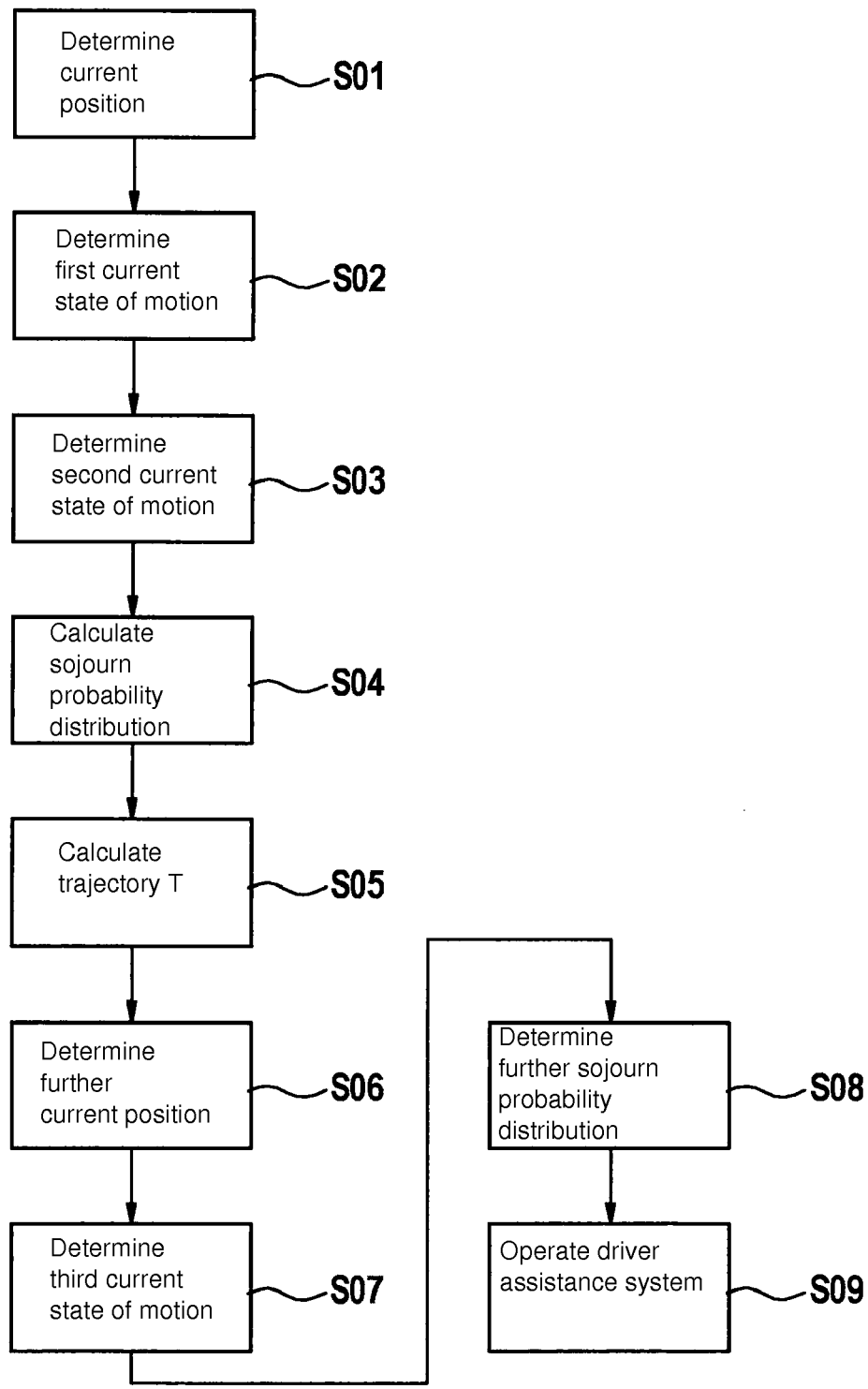
FIG. 1 shows a schematic flow diagram explaining a method for operating a driver assistance system for a vehicle according to a specific embodiment of the present invention.

FIG. 1 shows a schematic flow diagram explaining a method for operating a driver assistance system for a vehicle according to a specific embodiment of the present invention. In the description of FIG. 1, reference is also made to the following FIGS. 2 through 5, and to reference characters occurring therein. The numbering of method steps by reference characters is intended only to provide clarity, and is not intended to imply any chronological sequence, unless otherwise explicitly indicated. In particular, two or more method steps can also take place simultaneously.

In a method step S01, a current position of a pedestrian FG in a surrounding environment of vehicle F is determined. For this purpose, a pedestrian detection device 12 can be provided in a driver assistance system 10 according to the present invention, the device being suitable for the determination S01 of the current position of pedestrian FG in the surrounding environment of vehicle F; see FIG. 5.

In a method step S02, a first current state of motion of the determined pedestrian FG is determined. For this purpose, a first state of motion determination device 14 can be fashioned in driver assistance system 10; see FIG. 5.

The first current state of motion of pedestrian FG can include information concerning orientation, speed, acceleration, standing, walking, and/or running, relating to pedestrian FG.

In a method step S03, a second current state of motion of vehicle F is determined. For this purpose, a second state of motion determination device 16 can be fashioned in driver assistance system 10; see FIG. 5.

The second current state of motion of vehicle F can include information concerning orientation, speed, acceleration, standing, and/or motion of vehicle F. Such information can for example originate from a navigation device of vehicle F. Thus, second state of motion determination device 16 can be a navigation system, or can be connected to such a navigation system of vehicle F, and can receive information therefrom, and/or can communicate information thereto.

In a step S04, a sojourn probability distribution of pedestrian FG is calculated. The sojourn probability distribution is a function of time and space, and is based on a pedestrian motion model in connection with the determined current position of pedestrian FG and the determined current state of motion of pedestrian FG. For the calculation S04 of the sojourn probability distribution of pedestrian FG, a first computing device 18 can be fashioned in driver assistance system 10; see FIG. 5.

In a method step S05, a trajectory T is calculated having a minimum collision probability for vehicle F. Trajectory T is calculated based on the calculated sojourn probability distribution $P_{FG}$ of pedestrian FG, and in addition based on the second current state of motion of vehicle F. For the calculation S05 of trajectory T, a second computing device 20 can be fashioned in driver assistance system 10 for vehicle F; see FIG. 5.

In a method step S06, a further current position of a further vehicle GV is determined. In addition, other, possibly stationary, obstacles can be determined. For this purpose, a vehicle detection device 24 can be fashioned in driver assistance system 10; see FIG. 5.

In a method step S07, a third current state of motion of further vehicle GV is determined. For this purpose, a third state of motion determination device 26 can be fashioned in the driver assistance system; see FIG. 5. The third current state of motion of further vehicle GV can include the same amount, less, or more information than does the second current state of motion of vehicle F.

In a method step S08, a further sojourn probability distribution of further vehicle GV is calculated. For this purpose, a third computing device 28 can be fashioned in driver assistance system 10; see FIG. 5. The further sojourn probability distribution of further vehicle GV is a function of time and of space. In addition, the further sojourn probability distribution is based on a second vehicle motion model in connection with the determined further current position of further vehicle GV and the determined third current state of motion of further vehicle GV. The second vehicle motion model can be identical to the first vehicle motion model, or can differ therefrom.

For example, a second feature of further vehicle GV can be acquired, and a suitable second vehicle motion model based on the acquired second feature can be formed or can be selected from a database. For example, if further vehicle GV is a truck, a motion model specific to trucks can be used. In addition, the second features of further vehicle GV can for example be size, weight, estimated sale value, height, official identifier, and/or an identifying code transmitted by further vehicle GV. For this purpose, driver assistance system 10 can have a second feature determination device.

The calculation S05 of trajectory T is in addition based on the calculated further sojourn probability distribution of further vehicle GV.

In a method step S09, driver assistance system 10 of vehicle F is operated based on calculated trajectory T. For this purpose, a control device 22 can be fashioned in driver assistance system 10; see FIG. 5. According to the described specific embodiment, the operation S09 of driver assistance system 10 includes the feature that vehicle F is steered along calculated trajectory T by driver assistance system 10. For this purpose, a steering device 30 can be fashioned in driver assistance system 10; see FIG. 5.

Figure 2:
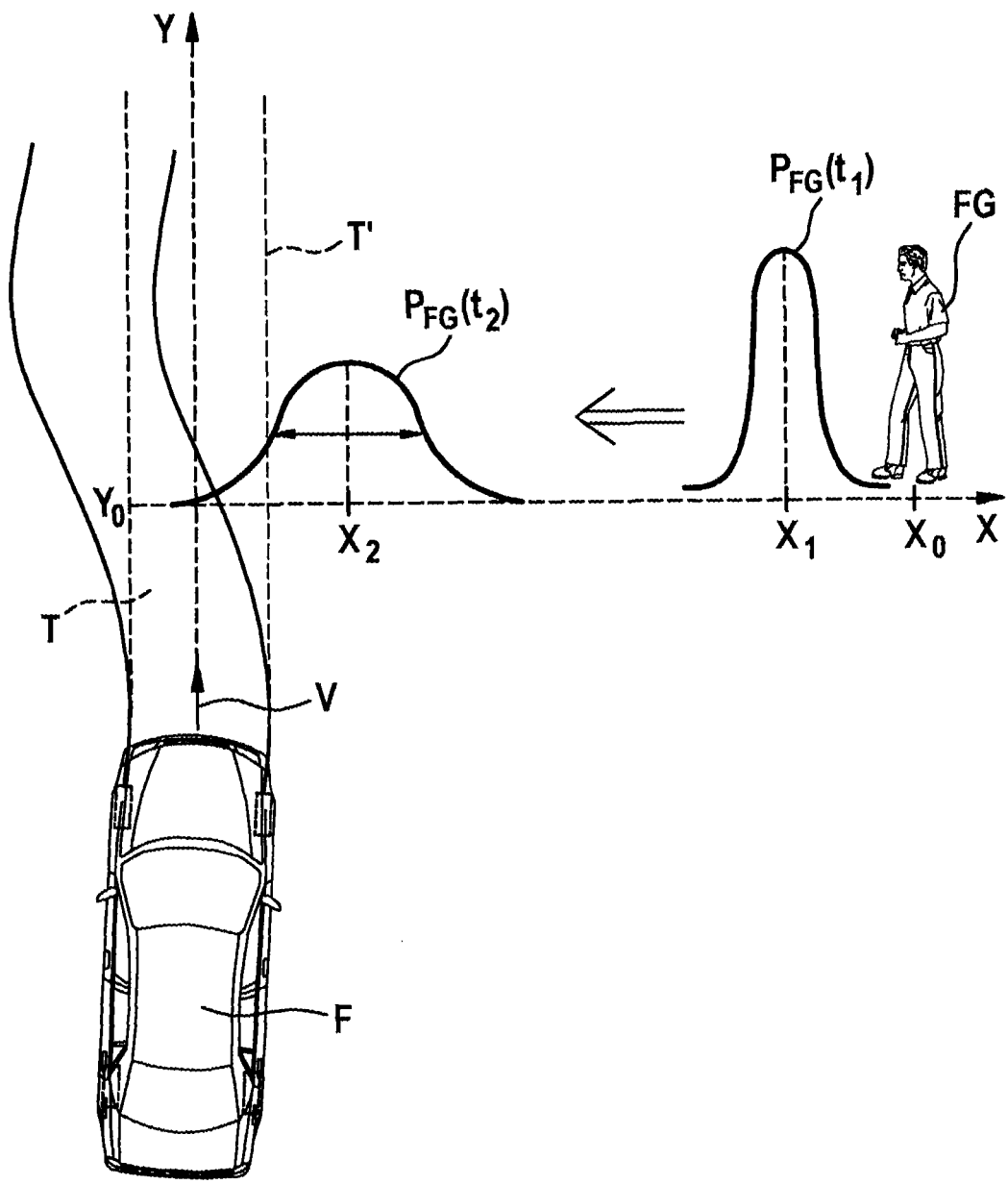
FIG. 2 shows a schematic representation of a traffic scene for the explanation of the method according to the described specific embodiment of the present invention.

FIG. 2 shows a schematic representation of a traffic scene for the explanation of the method according to the described specific embodiment of the present invention.

According to FIG. 2, vehicle F is currently moving in forward direction V. Pedestrian FG is, at time $T_0$, situated at the location having the coordinates $y_0$ in the y direction and $x_0$ in the x direction. Here, the y direction is oriented in the forward direction V of vehicle F, and the x direction is perpendicular to the y direction, and is parallel to a plane in which the travel path of vehicle F runs.

In addition, FIG. 2 schematically shows sojourn probability distribution $P_{FG}(t_1)$ of pedestrian FG at time $t_1$, as well as sojourn probability distribution $P_{FG}(t_2)$ at time $t_2$, as calculated in method step S04. Since, given a present speed of vehicle F that is part of the second current state of motion of vehicle F, as the forward travel of vehicle S continues the unmodified trajectory T' will intersect at time $t_2$, in a large region, with the calculated sojourn probability distribution $P_{FG}(t_2)$ of pedestrian FG at time $t_2$, trajectory T is calculated as shown in FIG. 2. Here, an intersection between trajectory T and calculated sojourn probability distribution $P_{FG}(t_2)$ of pedestrian FG at time $t_2$ becomes smaller. In the calculation of trajectory T, a maximum permitted collision probability can be specified, such that a collision probability for vehicle F on trajectory T must be less than or equal to this maximum collision probability.

Figure 3:
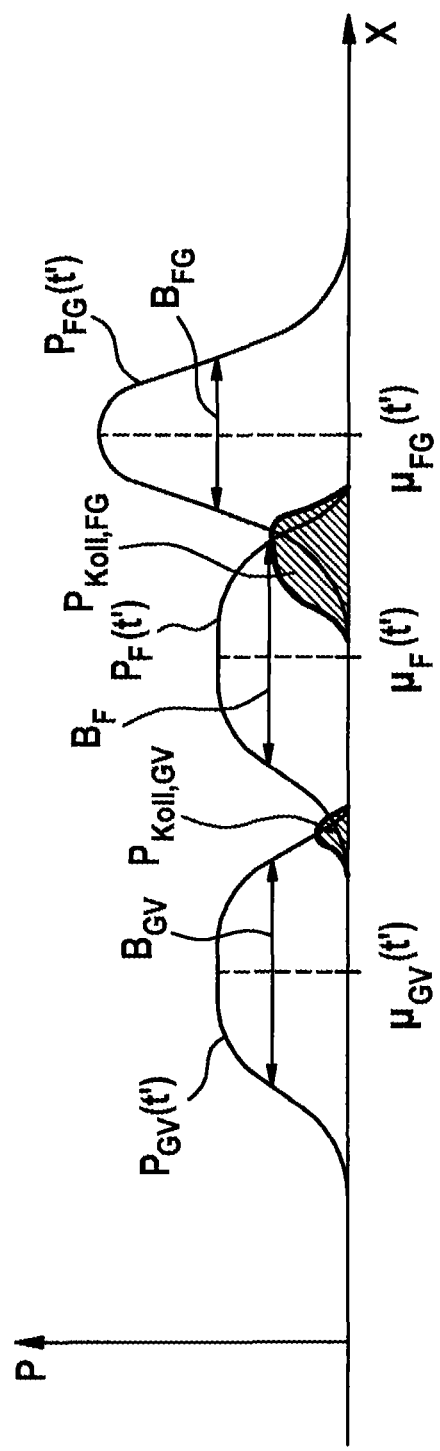
FIG. 3 shows a graph, shown as an example, having a plurality of sojourn probability distributions at a particular time t', as a function of the x coordinate.

FIG. 3 shows an example of a graph having a plurality of sojourn probability distributions at a particular time t' as a function of the x coordinate.

FIG. 3 shows the sojourn probability distribution $P_{FG}(t')$ of pedestrian FG having width $B_{FG}$ about a mean value $\mu_{FG}(t')$, further sojourn probability $P_{GV}(t')$ of further vehicle GV having width $B_{GV}$ about a mean value $\mu_{GV}(t')$, and a calculated third sojourn probability $P_F(t')$ of vehicle F having width $B_F$ about mean value $\mu_F(t')$. Calculated third sojourn probability distribution $P_F(t')$ of vehicle F can contain an inherent uncertainty, for example relating to roadway quality in the case of ice, resistance when driving vehicle F through water on the roadway, or the like. The overlap of sojourn probability distributions yields collision probabilities at time t'. In the depicted example, the collision probability $P_{Koll,FG}$ of vehicle F with pedestrian FG is greater than the collision probability $P_{Koll,GV}$ of vehicle F with further vehicle GV.

Trajectory T of vehicle F can be calculated in such a way that an overall collision probability is minimized as the sum of the two other individual collision probabilities. Alternatively, the calculation of trajectory T can also be based on a weighted sum of collision probabilities, such that for example collision probabilities $P_{Koll,FG}$ with pedestrians FG can enter more strongly into the weighting than do collision probabilities $P_{Koll,GV}$ with further vehicles GV. The weighting can also be conversely unequal. In addition or alternatively, individual thresholds thresh1, thresh2 can be specified that have to be observed and that each relate only to a single collision probability. For an example of a pedestrian FG to the right of vehicle F and an expected further vehicle to the left of vehicle F, for example for an x coordinate $x_{tr}$, of trajectory T, the following conditions can be specified:

$$P_{Koll,FG}(x<x_{tr})<\text{thresh1 and/or}$$

$$P_{Koll,GV}(x>x_{tr})>\text{thresh2}.$$

A width of vehicle F can here be assigned, for example one-half each, to pedestrian FG and to further vehicle GV, while vehicle F itself is regarded as a point. Threshold thresh1 can advantageously take the value 0.1, and threshold thresh2 can advantageously take the value 0.05. The minimum collision probability is then the smallest overall collision probability that meets the specifications of the individual thresholds thresh1, thresh2.

Figure 4:
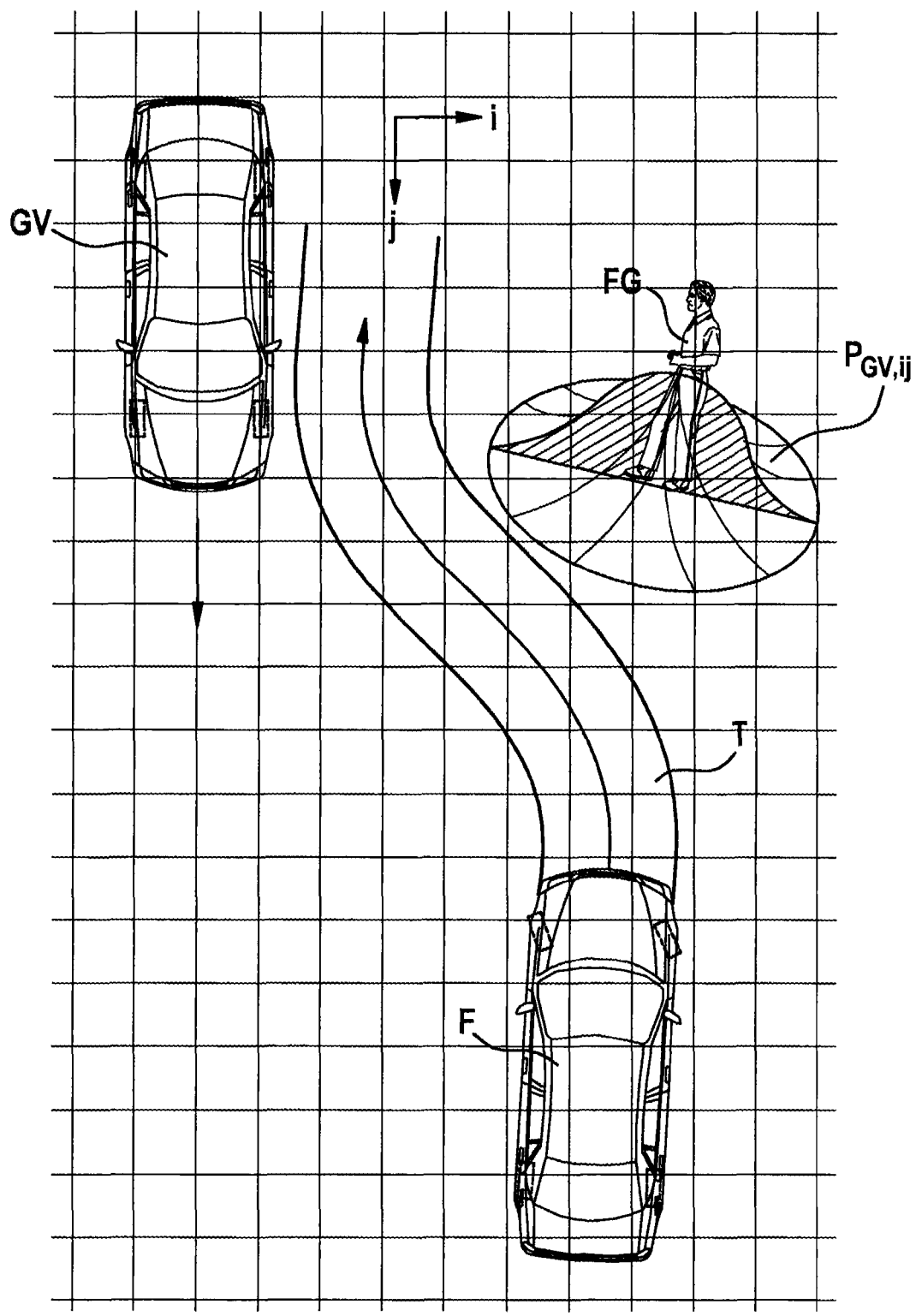
FIG. 4 shows a schematic representation of a traffic scene in a grid representation.

FIG. 4 shows a schematic representation of a traffic scene in a grid representation. In the grid representation, the environment around the vehicle F is divided into a multiplicity of cells having indices i and j. Sojourn probability $P_{FG,ij}$ of pedestrian FG, further sojourn probability distribution of further vehicle GV, and third sojourn probability distribution of vehicle F are each, in the grid representation, time-dependent sojourn probabilities as a function of the cells. In addition or alternatively to the criteria relating to the collision probabilities, it can be provided that trajectory T, at a time t'', can be routed only through those cells in which the sojourn probability distribution of pedestrian FG and/or the sojourn probability distribution of further vehicle GV at time t'' is less than or equal to a threshold value. The threshold value can be equal for pedestrian FG and further vehicle GV, but can also be selected to be different.

Figure 5:
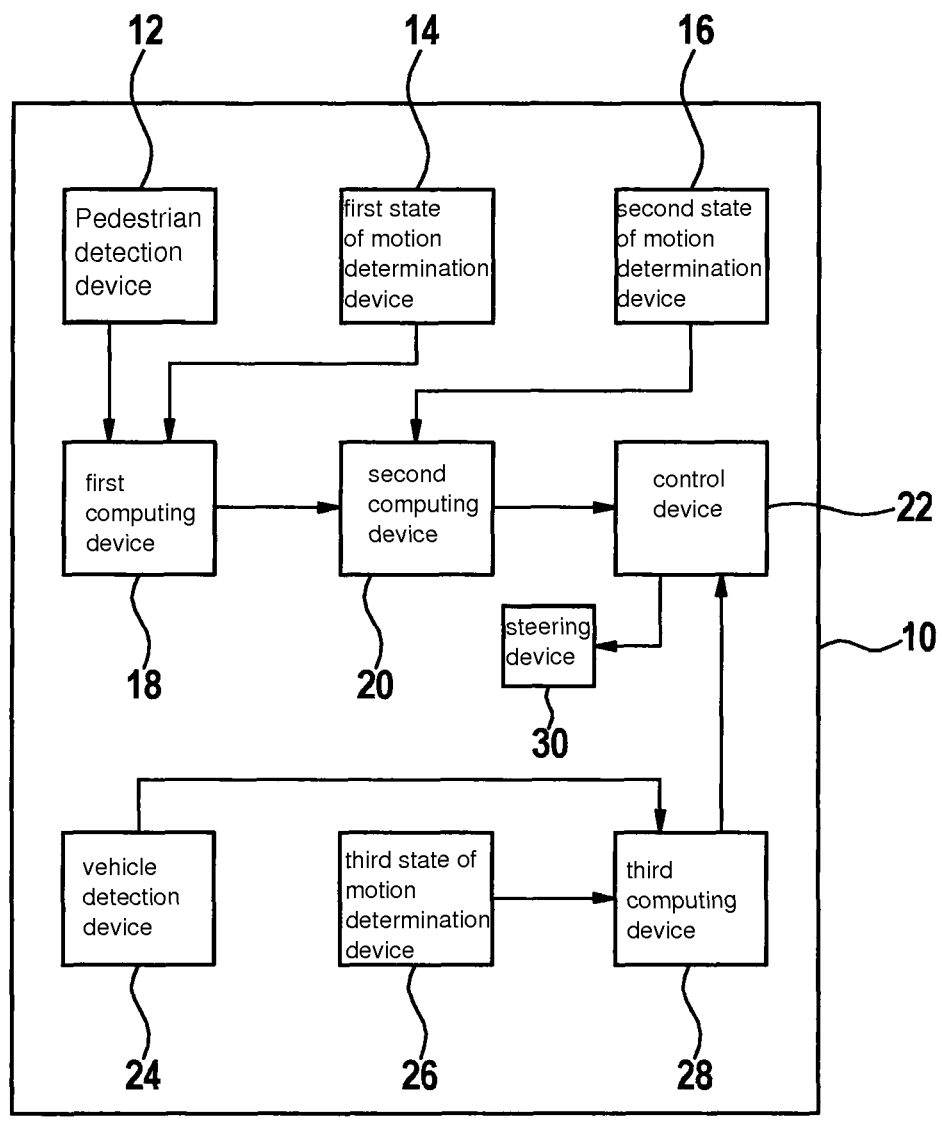
FIG. 5 shows a schematic block diagram of a driver assistance system according to a further specific embodiment of the present invention.

FIG. 5 shows a schematic block switching diagram of a driver assistance system 10 according to a further specific embodiment of the present invention, as described above with reference to FIGS. 1 through 4.

Although the present invention has been described above on the basis of preferred exemplary embodiments, it is not limited thereto, but rather can be modified in many ways. In particular, the present invention can be modified in many ways without departing from the core idea of the present invention.

What is claimed is:

1. A method of a driver assistance system of a vehicle, the driver assistance system including a sensor arrangement, a computing device, and a steering device, the method comprising:
   determining, by the driver assistance system and using the sensor arrangement thereof, a current position of a pedestrian in an environment surrounding the vehicle;
   determining, by the driver assistance system and using the sensor arrangement thereof, a first current state of motion of the pedestrian;
   determining, by the driver assistance system and using the sensor arrangement thereof, a second current state of motion of the vehicle;
   calculating, by the computing device of the driver assistance system, a sojourn probability distribution of the pedestrian, the sojourn probability distribution being a function of time and of space and being based on a pedestrian motion model in connection with the determined current position of the pedestrian and the determined current state of motion of the pedestrian;
   calculating, by the computing device of the driver assistance system and based on the calculated sojourn probability distribution of the pedestrian and on the second current state of motion of the vehicle, a trajectory of the vehicle with a minimum collision probability for the vehicle into the pedestrian; and
   operating, by the driver assistance system, the steering device to steer the vehicle along based the calculated trajectory of the vehicle.

2. The method as recited in claim 1, the first current state of motion of the pedestrian includes information concerning at least one of an orientation, speed, acceleration, standing, walking, and running of the pedestrian.

3. The method as recited in claim 1, further comprising:
   additionally acquiring a first individual feature of the pedestrian, wherein at least one of the calculation of the sojourn probability distribution of the pedestrian, the calculation of the trajectory, and the operation of the driver assistance system of the vehicle additionally taking place based on the acquired first individual feature of the pedestrian.

4. The method as recited in claim 1, further comprising:
   determining a further current position of a further vehicle;
   determining a third current state of motion of the further vehicle; and
   calculating a further sojourn probability distribution of the further vehicle, the further sojourn probability distribution being a function of time and of space, and being based on a vehicle motion model in connection with the determined further current position of the further vehicle and the determined third current state of motion of the further vehicle, the calculation of the trajectory further being based on the calculated further sojourn probability distribution of the further vehicle.

5. The method as recited in claim 4, further comprising:
   acquiring in addition a second feature of the further vehicle, wherein at least one of the calculation of the further sojourn probability distribution of the further vehicle, the calculation of the trajectory, and the operation of the driver assistance system of the vehicle further being based on the acquired second feature of the further vehicle.

6. The method as recited in claim 1, wherein the calculation of the trajectory takes place by a potential field method, according to which a target point of the vehicle exerts an attractive force and the sojourn probability distribution of the pedestrian exerts a repulsive force.

7. The method as recited in claim 1, wherein the surrounding environment of the vehicle is modeled in a grid representation, the sojourn probability distribution of the pedestrian indicating a time-dependent sojourn probability of the pedestrian in each of a multiplicity of cells of the grid representation, and the trajectory being capable of being guided, at a particular time, through cells of the grid representation in which a sojourn probability of the pedestrian at the particular time is less than or equal to a specifiable threshold value.

8. A driver assistance system for a vehicle, comprising:
   a sensor arrangement;
   a computing device; and
   a steering device;
   wherein:
      the driver assistance system is configured to use the sensor arrangement to determine a current position of a pedestrian in an environment surrounding the vehicle, a first current state of motion of the pedestrian, and a second current state of motion of the vehicle;
      the computing device is configured to:
         calculate a sojourn probability distribution of the pedestrian, the sojourn probability distribution being a function of time and of space and being based on a pedestrian motion model in connection with the determined current position of the pedestrian and the determined current state of motion of the pedestrian; and
         calculate, based on the calculated sojourn probability distribution of the pedestrian and the second current state of motion of the vehicle, a trajectory of the vehicle with a minimum collision probability for the vehicle into the pedestrian; and
      the driver assistance system is configured to operate the steering device to steer the vehicle along the calculated trajectory of the vehicle.

* * * * *